United States Patent [19]

Fassbender et al.

[11] Patent Number: 5,072,585
[45] Date of Patent: Dec. 17, 1991

[54] HYDROSTATIC AUXILIARY-POWER STEERING DEVICE

[75] Inventors: Rolf Fassbender, Mutlangen; Bernd Ilg, Heuchlingen, both of Fed. Rep. of Germany

[73] Assignee: Zahnradfabrik Friedrichshafen, AG, Friedrichshafen, Fed. Rep. of Germany

[21] Appl. No.: 499,267
[22] PCT Filed: Jan. 14, 1988
[86] PCT No.: PCT/EP89/00040
§ 371 Date: May 31, 1990
§ 102(e) Date: May 31, 1990
[87] PCT Pub. No.: WO89/06618
PCT Pub. Date: Jul. 27, 1989

[30] Foreign Application Priority Data
Jan. 20, 1988 [DE] Fed. Rep. of Germany ....... 3801452

[51] Int. Cl.$^5$ .............................................. F16D 31/02
[52] U.S. Cl. .................................... 60/384; 60/387; 180/132
[58] Field of Search ................... 60/384, 387, 469; 180/132

[56] References Cited
U.S. PATENT DOCUMENTS

| | | | |
|---|---|---|---|
| 4,462,209 | 7/1984 | Thomsen et al. | 60/384 |
| 4,495,769 | 1/1985 | Tischer et al. | 60/384 X |
| 4,548,035 | 10/1985 | Thomsen et al. | 60/384 |
| 4,553,389 | 11/1985 | Tischer et al. | 60/387 X |

FOREIGN PATENT DOCUMENTS 1650575 2/1972 Fed. Rep. of Germany.

Primary Examiner—Edward K. Look
Assistant Examiner—Hoang Nguyen
Attorney, Agent, or Firm—Albert M. Zalkind

[57] ABSTRACT

Hydrostatic auxiliary power steering devices transmit the steering power to the steered wheels via oil pressure. Such devices utilize a metering pump 5 and a steering valve 2 combined into a single unit. The metering pump distributes oil flow produced by a power steering pump 1 to a pressure operated steering power cylinder 8 under control of a steering valve 2 responsive to drive rotation of the vehicle steering wheel. The oil flow synchronizes the angle of rotation of the steering wheel with the angle of the lock of the wheels being steered. In hydrostatic systems there is a tendency to pressure oscillations. In the present invention these oscillations are minimized without occurring excessive pressure loss. The arrangement provides an inlet conduit 4 for steering, a damping valve 11 having a damping piston 12 centered by springs 13, 14 and closing off a branch conduit 6 which stops flow to the metering pump 5. When pressure is involved by rotation of the steering wheels the damping piston 12 releases a flow cross section from the inlet conduit 4 to the branch conduit 6 leading to the metering pump 5. Accordingly, rapid changes in pressure in the inlet conduit 4 when oil is fed to the metering pump 5 are delayed.

10 Claims, 2 Drawing Sheets

HYDROSTATIC AUXILIARY-POWER STEERING DEVICE

BACKGROUND OF THE INVENTION

The invention relates to a hydrostatic auxiliary-power steering device.

In such steering mechanisms, what is involved are oscillatory systems that tend toward pressure oscillation without damping measures. These pressure oscillations are kept stationary even when the operating condition is unchanged. Pressure oscillations can be eliminated by various measures, with a result of pressure losses or with an unfavorable effect on the synchronization characteristics of the steering mechanism. In the same way, the automatic steering reverse motion can deteriorate.

BRIEF DESCRIPTION OF THE PRIOR ART

In a steering mechanism known from DE-PS 28 07 464, the control slide of the steering valve is shaped in such a way that the damping effect remains small in the neutral position of the slide. In that way, the automatic steering reverse motion is almost unhindered. However, since a damping effect occurs in the displacement positions of the control slide, the steering reverse motion can already be hindered very strongly when there is a relatively small torque at the steering wheel. This is attributable to the fact that the control slide is shifted by the torque, with guiding edges forming a restrictor acting as a damping means. The pressure oil that is driven out of the steering motor must then flow back through this restrictor. Furthermore, big losses of pressure occur at high steering speeds since a large stream of oil has to flow through the restrictor. These pressure losses simulate a high steering resistance at the metering pump that is capable of being driven by the steering wheel, so that, when the steering motor leads with respect to the steering wheel rotation, no corresponding reaction of the steering valve can occur to counteract the disturbance of synchronization.

A steering valve for a hydrostatic steering mechanism also is known from DE-PS 23 34 365 in which control collars, control grooves and guiding edges serve the purpose of sealing and throttling the pressure oil. That steering valve has the task of generating a certain pressure-regulating characteristic curve. The pressure oscillations that occur are supposed to be broken up by a flat ascent of the characteristic curve. A disadvantage of such a design lies in the fact that not any degree of flatness at all can be selected for the ascent of the characteristic curve. That is only possible through an enlargement of the steering valve piston stroke, as a result of which the steering precision deteriorates. Since the steering mechanisms in question are frequently supplied with a stream of pressure oil whose height changes with the rate of rotation of the pump, the desired flat ascent is automatically possible only for a certain working point of the apparatus.

Therefore it is the object of the invention to provide a damping device for a hydrostatic steering mechanism that does not generate high pressure losses or influence the steering mechanism's synchronization characteristics disadvantageously. Furthermore, the suggested damping is intended to be effective at any working point of the steering mechanism.

SUMMARY OF THE INVENTION

According to the invention, a damping valve is provided for the hydrostatic steering mechanism in the intake conduit. A piston valve of the damping valve blocks a branch conduit leading from the intake conduit to the metering pump in its midposition centered by the biasing forces of a sparing. When pressure is applied as a result of adjusting movement of the steering valve, a flow cross-section to the metering pump's branch conduit opens at the piston valve. By this arrangement, only a delayed development in the branch conduit of a quick change of pressure in the intake conduit when there is a pickup of volume in the metering pump is possible. As a result, oscillations in the steering mechanism can be reliably dampened. If pressure fluctuations take place without rotational movements at the steering wheel, the damping is infinitely high since the piston valve remains in the blocked mid-position independently of the average absolute pressure in the intake conduit, and thus separates the intake conduit from the branch conduit. Location of the damping valve in the intake conduit to the steering valve has the additional advantage that the latter only has to be present once for both steering directions.

For pressure activation, a spring chamber is located at each side of the damping piston's face, with one of the chambers being connected with the intake conduit and the other chamber with the branch conduit leading to the metering pump. One of the two connections contains an impedance, whereby sudden displacement of the damping piston is avoided. A nonreturn valve is located parallel to that impedance, so that a rapid exchange of oil from the corresponding chamber is possible when there is a movement of the damping piston.

In a further embodiment of the invention, the flow cross-section from the intake conduit to the branch conduit is through a controllable groove and an axial drilled hole in the damping piston. In that case, the flow cross-section from the power-steering pump to the metering pump that is unblocked by the damping piston is gradually enlarged with the displacement movement. Therefore, an opening of the damping valve in the direction of flow of the pressure oil from the intake conduit to the branch conduit of the metering pump only takes place after a delay.

Furthermore, the damping piston can be designed in such a way that it takes over an additional function for the automatic steering reverse motion. In that case, the pressure in the branch conduit is higher than in the intake conduit and the damping piston is displaced in the direction opposite to the direction of the opening. Consequently, another controllable groove connected with the axial bore in the damping piston is provided that is capable of being connected with the intake conduit, whereby oil pushed out by the steering motor through the metering pump can flow to the reservoir through the steering valve, which is in the neutral position.

BRIEF DESCRIPTION OF THE FIGURES

Further details regarding the invention are explained more completely with the assistance of the drawings, in which.

DETAILED DESCRIPTION

Figure 1:
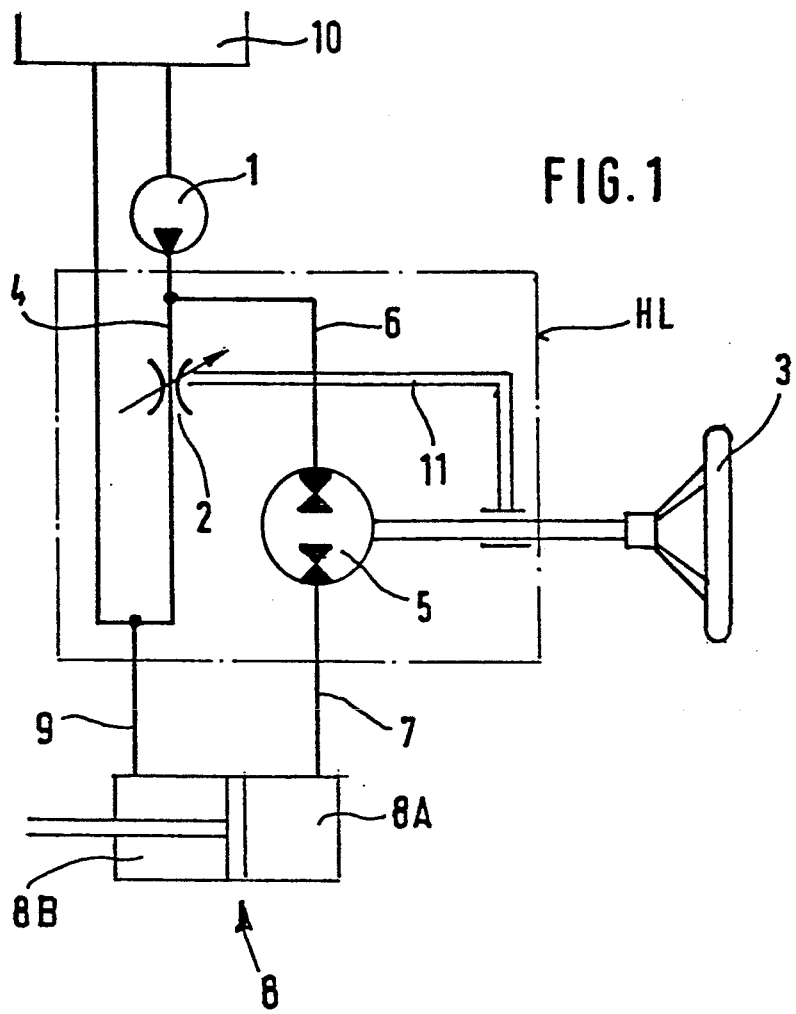
FIG. 1 is a hydraulic circuit diagram of a hydrostatic steering mechanism according to the state of the art in an excursion position of the steering valve.

The problem on which the invention is based can be made clear by the state of art of FIG. 1. The diagrammatic view shows an HL hydrostatic steering mechanism in an excursion position because it is more easily understandable. For reasons of simplification, a steering valve 2 is drawn as an adjustment orifice or throttle. The flow of oil of a power-steering pump 1 is throttled at the steering valve 2 with increasing activation moment at a steering wheel 3. As a result, the pressure in an intake conduit 4 between the power-steering pump 1 and the steering valve 2 increases. A conduit 6 leading to an intake side of the metering pump 5 is connected with the intake conduit 4. A discharge side of the metering pump 5 is connected with a pressure chamber 8A of a steering motor 8 by a conduit 7. The other pressure chamber 8B is connected with a reservoir 10 by a conduit 9. Changes in pressure at the steering valve 2, even without corresponding piston movements in the steering motor 8, result in small movements of the metering pump 5 through elasticities in the pressure chambers 8A and 8B and in the conduit 7. Through a mechanical connection 11, these movements, in turn, influence the sectional area of flow at the steering valve 2. A system capable of oscillating comes into being in this way. Corresponding to the movement of the metering pump 5, a flow of pressure oil is moved back and forth in the conduits 6 and 7. In a similar way, pressure fluctuations can also develop during a steering process. When that is the case, torsional oscillations override the rotation of the metering pump 5—that is, the flow of pressure oil in the conduits 6 and 7 increases. Since changes of flow occur simultaneously in the conduits 6 and 7 when there are pressure fluctuations, a damping effect could be obtained by installing nonreturn valves. However, if such a step were taken, the fact that a nonreturn valve does not have a damping effect when the change of flow of pressure oil is increasing would be disadvantageous, and the automatic return steering motion would be stopped. In the case of automatic steering reverse motion, the pressure oil pushed out by the steering motor 8 must be able to flow back through the conduit 7 to the metering pump 5 and from there through the conduit 6 and the steering valve 2 to the reservoir 10.

If fixed restrictors were installed in the conduits 6 and 7 for damping purposes, oscillations when pressure oil flows are changing and when they are increasing could be stopped. However, doing so would be unfavorable because the entire flow of pressure oil would have to flow to the steering motor 8 through the restrictors. This flow of pressure oil behaves proportionally to the speed of rotation of the steering wheel. Therefore it can fluctuate through a broad range between zero and a maximum flow. If the restrictors in the conduits 6 and 7 that are selected are so small that a good damping effect results, a large loss of pressure comes into being at maximum steering speed.

Figure 2:
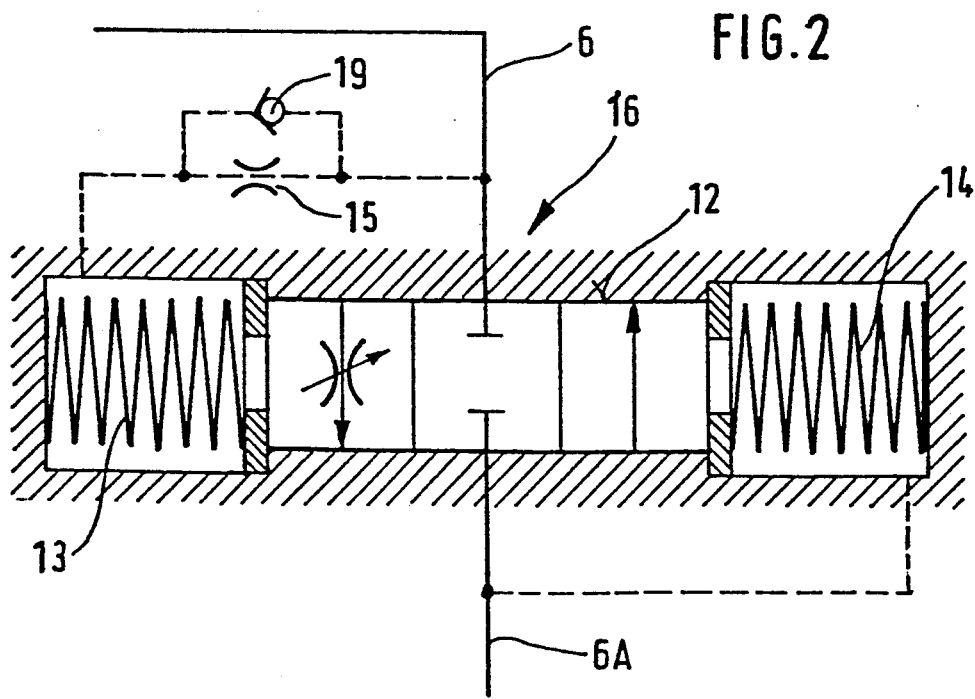
FIG. 2 is a diagrammatic representation of a damping valve according to the invention.

FIG. 2 makes it clear that, according to the invention, a damping valve 16 is inserted in the conduit 6. The damping valve 16 includes a damping piston 12 acting as a pressure regulator and springs 13 and 14 which hold the piston in a middle or neutral position. In that mid-position, the damping piston shuts off the conduit 6. If a pressure is applied at the steering valve 2 by rotating the steering wheel 3, that pressure also acts in the conduit 6 connected with the power-steering pump 1. Through an orifice 15, that pressure is on the left face of the damping piston 12. The right face of the damping piston 12 is connected with a conduit 6A leading to the metering pump 5. The pressure applied to the left face moves the damping piston 12 to the right, so that the conduits 6 and 6A are connected with each other. The speed at which the damping piston 12 is moved to the right determines the size of the orifice 15. The speed at which the flow cross-section between the conduits 6 and 6A increases can be determined by the shape of the guiding edges that correspond with each other. In this way, rapid changes of pressure in the conduit 6A leading to the metering pump 5 when steering movements are made can be reduced. Pressure fluctuations that occur when steering movements are made and generate an increasing flow of oil in the conduit 6 can also be cushioned since the connecting cross-section of the conduits 6 and 6A is only enlarged after a delay. A rapid increase of flow in the conduit 6 is throttled temporarily in that way. Thus the damping also functions in the case of dynamic processes.

In static operating conditions, the loss of pressure at the damping valve 16 is slight because only a differential pressure that corresponds to the power of the spring divided by the damping piston cross-section is required to move the piston valve 12 to the right. Another increase of the damping effect can be obtained by a nonreturn valve 19 installed parallel to the orifice 15. That nonreturn valve allows the damping piston 12 to move quickly to the left when there is a dynamic subsidence of the flow of oil in the conduit 6. The connecting cross-section between the conduits 6 and 6A then closes very quickly to a value suited to the smallest momentary flow. If the oil flow in the conduit 6 is then increased, the full damping effect ensues.

When there is an automatic return of the turned wheels to the straight-ahead-travel position, the oil flows into the conduit 6A in the opposite direction—that is, on the side of the spring 14. The damping piston 12 then moves to the left out of the mid-position indicated in the drawing. As a result, an unthrottled connection of the conduit 6a with the conduit 6 is possible. This process is explained in greater detail below in connection with FIG. 3.

Figure 3:
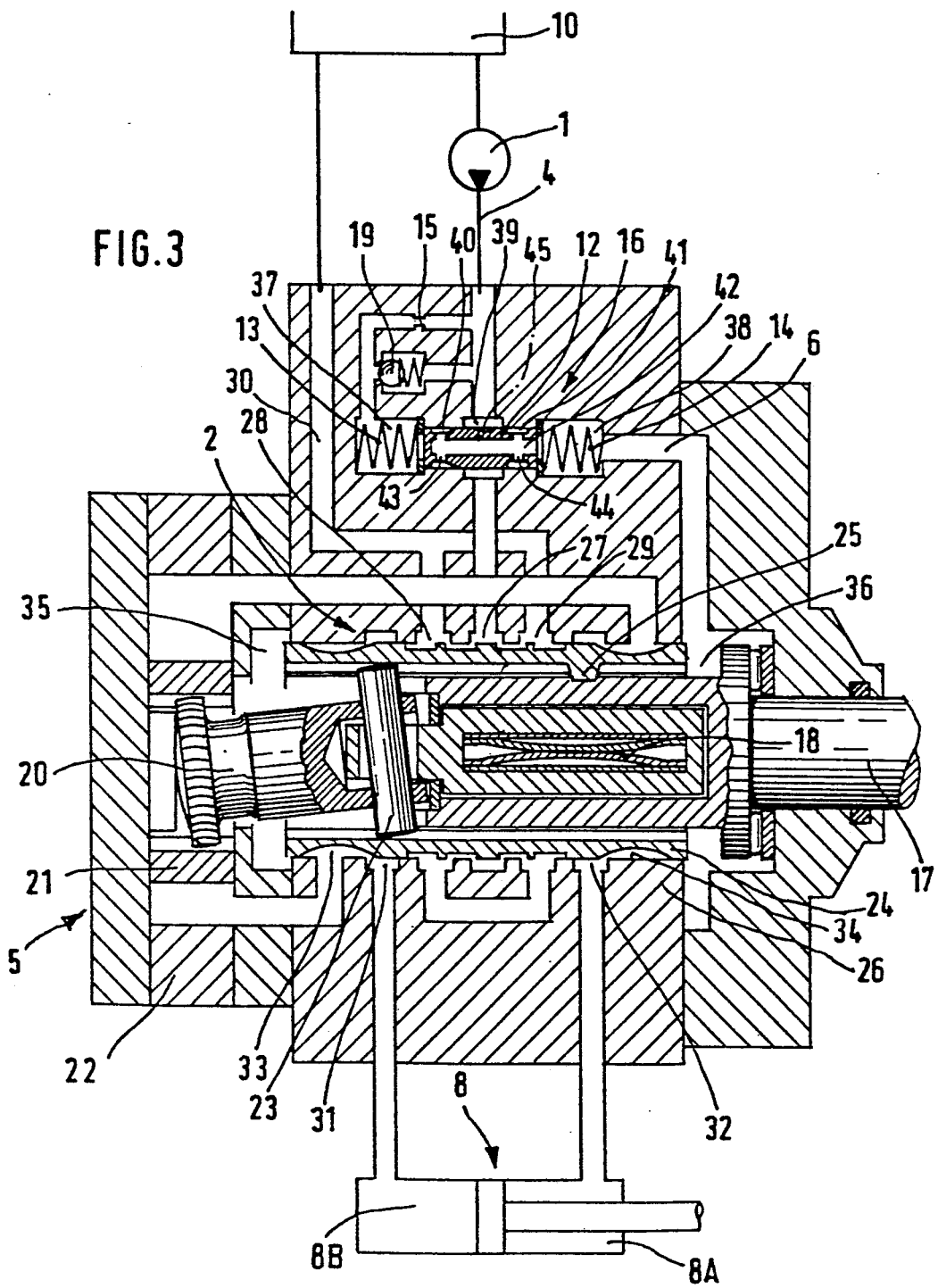
FIG. 3 is a sectional view of a hydrostatic steering mechanism with the damping valve.

FIG. 3 shows an installation of the damping valve of the invention in a hydrostatic steering device. The reference numbers already allocated in FIGS. 1 and 2 are used again in FIG. 3. Such steering devices, up to the damping valve 16, are generally known, so that the following description provides only a rough, general view.

A steering shaft 17 fastened to a steering wheel is connected with a rotor 21 by a centering element 18 and a universal-joint shaft 20. The rotor 21, together with a stator 22, forms the metering pump 5. A pin 23 connects a steering valve piston 24 of the steering valve with the universal-joint shaft 20. The steering shaft 17 can perform a relative rotation through the centering element 18 in both directions of rotation with respect to the universal-joint shaft 20 and the piston valve 24. In that connection, the centering element 18 is constructed so that it brings the steering shaft 17 and the universal-joint shaft 20 up to each other in a specific position without the influence of external forces. The piston valve 24 has a thread 25 that slides in a corresponding groove in the steering shaft 17. If one rotates the steering shaft 17 at the steering wheel relative to the piston valve 24, the latter is moved axially into a housing 26. With the help of arms and grooves in housing 9 and at the piston valve 24, its adjustment displacement is used to change the direction of the flow of pressure oil in accordance with the direction of rotation of the steering wheel and to apply the pressure that is required for steering. The flow from the power-steering pump 1 is from the intake conduit 4 into an annular groove 27. In the neutral position of the steering valve 2 formed by the housing 26 and the piston valve 24 shown in the drawing, the pressure oil flows through annular grooves 28 and 29 and a return conduit 30 to the reservoir 10. The steering motor 8 is connected with two other annular grooves 31 and 32. The metering pump 5 is connected with axial grooves 33 and 34. If the piston valve 24 is moved when a steering movement takes place—to the left, for example—the downflow cross-section between the annular groove 27 and the annular grooves 28 and 29 is reduced by the arms. As a result, the pressure in the intake conduit 4 increases. At the same time, enlarged chambers of the metering pump 5 connected with the axial groove 33 are connected with an annulus 35. Chambers of the metering pump 5 pushing pressure oil out are connected with the annular groove 32 by the axial groove 34, so that the pressure oil can flow to the pressure chamber 8A of the steering motor 8. The annular groove 31, with which the other pressure chamber 8B of the steering motor 8 is connected, is connected with the annular groove 28 and with the reservoir 10 by the return conduit 30. Consequently, the piston of the steering motor 8 moves to the left.

The annulus 35 is connected with another annulus 36 by slits running past the centering element 18 and the steering shaft 17. This annulus 36 is connected with a branch conduit 6 that leads to a chamber 38 on the face of the damping piston 12. A front-side chamber 37 located opposite it is connected with the intake conduit 4 by the orifice 15 and the nonreturn valve 19. In the two chambers 37 and 38 are the springs 13 and 14 that hold the damping piston 12 in its neutral mid-position. The intake conduit 4 leading from the power-steering pump 1 to the annular groove 27 is connected with an annular groove 39 of the damping valve 16. In the damping piston 12 there is a groove 40 that works with the annular groove 39. The groove 40 is connected with the conduit 6, which is referred to as a branch conduit 6 in the descriptions and is capable of being connected with the intake conduit 4 by a short radial bore 43 and an axial bore 42. In the mid-position shown in the drawing, the damping piston 12 blocks the intake conduit 4.

If the pressure in the intake conduit 4 is increased by movement of the piston valve 24, that pressure acts on the left face, via the chamber 37 of the damping piston 12. If the metering pump 5 picks up pressure oil, the damping piston 12 is moved to the right. Connection of the annular groove 39 with the groove 40 occurs. The damping piston 12 is moved to the right until the drop in pressure between the annular groove 39 and the groove 40 corresponds to the power of the spring 13 divided by the cross-sectional area of the damping piston 12. Since the pressure oil has to flow through the orifice 15, the movement of the damping piston 12 is more or less strongly delayed, depending upon the cross-section of the orifice. As a result, a connection between the power-steering pump 10 and the metering pump 5 gradually takes place when there is a rapid increase in pressure in the intake conduit 4. If the damping piston 12 is designed with a guiding edge at groove 40 so that its filtering cross-section increases slowly with the displacement movement to the right, a piston stroke S1 corresponds to a flow Q1 from the intake conduit 4 to the branch conduit 6, starting from the mid-position, and a path S2 clearly differing from the piston stroke S1 corresponds to a stream Q2. If, in that situation, fluctuations of pressure in the intake conduit 4 take place, to which the metering pump 5 reacts with varying flow pickup, a reaction of the metering pump 5 to an increasing pressure in the intake conduit 4 can only take place as an attenuated reaction because the cross-section of the opening for the flow of oil is enlarged only gradually by the delayed movement of the damping piston 12 to the right. The use of the orifice 15 in combination with the specially designed guiding edge on the groove 40 permits a varying of the damping effect within broad limits.

Thus the regulator circuit comprising the steering valve piston 24 and the metering pump 5 contains a damping device that is effective when there is a dynamic increase in pressure in the intake conduit 4 and flow fluctuations resulting therefrom. Since an increased throttling of the flow of oil from the intake conduit 4 to the branch conduit 6 only occurs briefly, the static losses of pressure of the damping device remain small. The damping effect can be further improved by the nonreturn valve 19 that is installed parallel to the orifice 15. The nonreturn valve 19 makes a rapid movement of the damping piston 12 to the left possible when the flow of pressure oil to the metering pump 5 is subsiding. As a result, the damping effect is immediately present again when there is a subsequent increase in the stream.

Since the steering motor 8 in the embodiment shown in FIG. 3 is not blocked in the neutral position of the steering valve 2, the turned wheels return automatically to their straight-ahead-travel position. For that reason, another groove 41 that is also connected with the axial bore 42 by a radial bore 44 is needed in the damping piston 12. The steering motor 8 drives the metering pump 5 by the backward movement. Since the torques at the steering wheel retain their direction, as they do when rounding curves, in spite of the fact that the wheels are running backward, the position of the piston valve 24 does not change. However, the flows of pressure oil through the steering valve 2 change their direction—that is, pressure oil from the branch conduit 6 must be able to flow to the intake conduit 4. Since the pressure in the branch conduit 6 is greater in this case than in the intake conduit 4, the damping piston 12 is moved to the left. The nonreturn valve 19 permits this movement. As a result of the fact that the groove 41 connects with the groove 39, an unthrottled flow from the branch conduit 6 to the intake conduit 4, and thereby also to the tank 10, can be established quickly. No damping is required in this process.

To avoid or minimize pressure peaks when there are rapid steering procedures, it can be advantageous to provide a close connection—such as by providing a bore 45—already in the mid-position of the damping piston 12, between the intake conduit 4 and the branch conduit 6. If the connection selected is so small that oscillations can be prevented by its strong throttling action, that throttling action is not disadvantageous for the damping characteristics of the damping valve 11.

We claim:

1. In a hydrostatic auxiliary-power steering device including a power-steering pump for delivering a flow of pressure oil to an intake conduit, a steering motor connected with the intake conduit by a steering valve that is adjustable by rotation of a steering wheel and a metering pump that is driven by rotation of the steering wheel, and a branch conduit leading to the metering pump and connected with the intake conduit, the improvement which comprises
a damping valve (16) arranged in said intake conduit (4), said damping valve including
(a) a piston (12) shiftable between a neutral middle position and operating positions; and
(b) spring means (13, 14) for biasing said piston toward its neutral position, said piston blocking the branch conduit (6) when in the neutral position and opening a flow cross-section from the intake conduit to the branch conduit of the metering pump (5) when in an operating position.

2. A hydrostatic auxiliary-power steering device as defined in claim 1, wherein the flow cross section from the intake conduit to the branch conduit is defined by a controllable groove (40) in said piston that is connected with an axial drilled bore (42).

3. A hydrostatic auxiliary-power steering device according to claim 1, wherein the flow cross section from the power-steering pump to the metering pump that is unblocked by the piston gradually increases with displacement of the piston.

4. A hydrostatic auxiliary-power steering device as defined in claim 1, wherein said piston includes a second controllable groove (41) that is connected with the axial bore (42) when said piston is shifted to the left.

5. In a hydrostatic auxiliary-power steering device including a power-steering pump for delivering a flow of pressure oil to an intake conduit, a steering motor connected with the intake conduit by a steering valve that is adjustable by rotation of a steering wheel and a metering pump that is driven by rotation of the steering wheel, and a branch conduit leading to the metering pump and connected with the intake conduit, the improvement which comprises
a damping valve (16) arranged in said intake conduit (4), said damping valve including
(a) a piston (12) shiftable between a neutral middle position and operating positions;

(b) a pair of chambers (37, 38) arranged at opposite ends of said piston, one of said chambers being connected with the intake conduit and the other of said chambers being connected with the branch conduit (6); and
(c) spring means (13, 14) arranged in said chambers for biasing said piston toward its neutral position, said piston blocking the branch conduit when in the neutral position and opening a flow cross-section from the intake conduit to the branch conduit of the metering pump (5) when in an operating position.

6. A hydrostatic auxiliary-power steering device as defined in claim 5, wherein said one chamber is connected with the intake conduit via an orifice (15).

7. A hydrostatic auxiliary-power steering device as defined in claim 6, wherein a nonreturn valve (19) is connected is parallel with said orifice.

8. A hydrostatic auxiliary-power steering device as defined in claim 5, wherein said other chamber is connected with the branch conduit via an orifice (15).

9. A hydrostatic auxiliary-power steering device as defined in claim 8, wherein a nonreturn valve (19) is connected in parallel with said orifice.

10. In a hydrostatic auxiliary-power steering device including a power-steering pump for delivering a flow of pressure oil to an intake conduit, a steering motor connected with the intake conduit by a steering valve that is adjustable by rotation of a steering wheel and a metering pump that is driven by rotation of the steering wheel, and a branch conduit leading to the metering pump and connected with the intake conduit, the improvement which comprises
a damping valve (16) arranged in said intake conduit (4), said damping valve including;
(a) a piston (12) shiftable between a neutral middle position and operating positions;
(b) spring means (13, 14) for biasing said piston toward its neutral position, said piston normally blocking the branch conduit (6) when in the neutral position and opening a flow cross-section from the intake conduit to the branch conduit of the metering pump (5) when in an operating position; and
(c) said piston containing a narrow bore (45) between the intake conduit and the branch conduit when the piston is in the neutral position.

* * * * *